(12) United States Patent
Palande et al.

(10) Patent No.: US 8,151,920 B2
(45) Date of Patent: Apr. 10, 2012

(54) HEAT EXCHANGER ASSEMBLY FOR THE FRONT SECTION OF A MOTOR VEHICLE

(75) Inventors: Pradeep Palande, Asperg (DE); Thomas Pillas, Münchingen (DE); Andreas Seeger, Altdorf (DE); Vitalij Bauer, Lippstadt (DE); Robert Raulf, Lippstadt (DE); Gaoming Zhao, Lippstadt (DE); Ravi Kumar, Mumbai (IN)

(73) Assignees: Behr GmbH & Co., Stuttgart (DE); HPBO GmbH, Lippstadt (DE); Behr India Ltd., Pune (IN)

( * ) Notice: Subject to any disclaimer, the term of this patent is extended or adjusted under 35 U.S.C. 154(b) by 611 days.

(21) Appl. No.: 11/575,832

(22) PCT Filed: Sep. 21, 2005

(86) PCT No.: PCT/EP2005/010183
§ 371 (c)(1),
(2), (4) Date: May 22, 2007

(87) PCT Pub. No.: WO2006/032471
PCT Pub. Date: Mar. 30, 2006

(65) Prior Publication Data
US 2008/0017429 A1    Jan. 24, 2008

(30) Foreign Application Priority Data
Sep. 22, 2004 (DE) .......................... 10 2004 047 583

(51) Int. Cl.
*B60K 11/04* (2006.01)

(52) U.S. Cl. ...................................... 180/68.4; 180/68.6
(58) Field of Classification Search ................. 180/68.4, 180/68.6
See application file for complete search history.

(56) References Cited

U.S. PATENT DOCUMENTS

| 4,541,645 | A | * | 9/1985 | Foeldesi | 180/68.4 |
|---|---|---|---|---|---|
| 5,046,550 | A | * | 9/1991 | Boll et al. | 165/41 |
| 6,260,609 | B1 | * | 7/2001 | Takahashi | 165/69 |
| 6,386,497 | B1 | | 5/2002 | Guyomard et al. | |
| 2004/0069446 | A1 | * | 4/2004 | Horiuchi | 165/43 |
| 2004/0084236 | A1 | * | 5/2004 | Okai et al. | 180/68.4 |

FOREIGN PATENT DOCUMENTS

| DE | 41 28 113 A1 | 2/1993 |
|---|---|---|
| DE | 199 11 832 A1 | 9/1999 |
| DE | 100 08 638 A1 | 9/2000 |
| DE | 199 44 437 A1 | 3/2001 |
| DE | 101 36 898 A1 | 2/2003 |
| DE | 10 2004 002 154 A1 | 8/2005 |
| DE | 10 2004 003 197 A1 | 8/2005 |
| EP | 0 417 500 A2 | 3/1991 |
| EP | 1 067 005 A1 | 1/2001 |
| JP | 10-148123 A | 6/1998 |

* cited by examiner

*Primary Examiner* — Katy M Ebner
(74) *Attorney, Agent, or Firm* — Foley & Lardner LLP

(57) ABSTRACT

The invention relates to a heat exchanger assembly, in particular a radiator assembly for the front section of a motor vehicle, including a heat exchanger. The heat exchanger is configured in several parts in the form of heat exchanger elements, i.e. at least one primary heat exchanger and at least one secondary heat exchanger, and at least two of the heat exchanger elements can be displaced in relation to one another in the event of a crash.

13 Claims, 7 Drawing Sheets

HEAT EXCHANGER ASSEMBLY FOR THE FRONT SECTION OF A MOTOR VEHICLE

Figure 1:
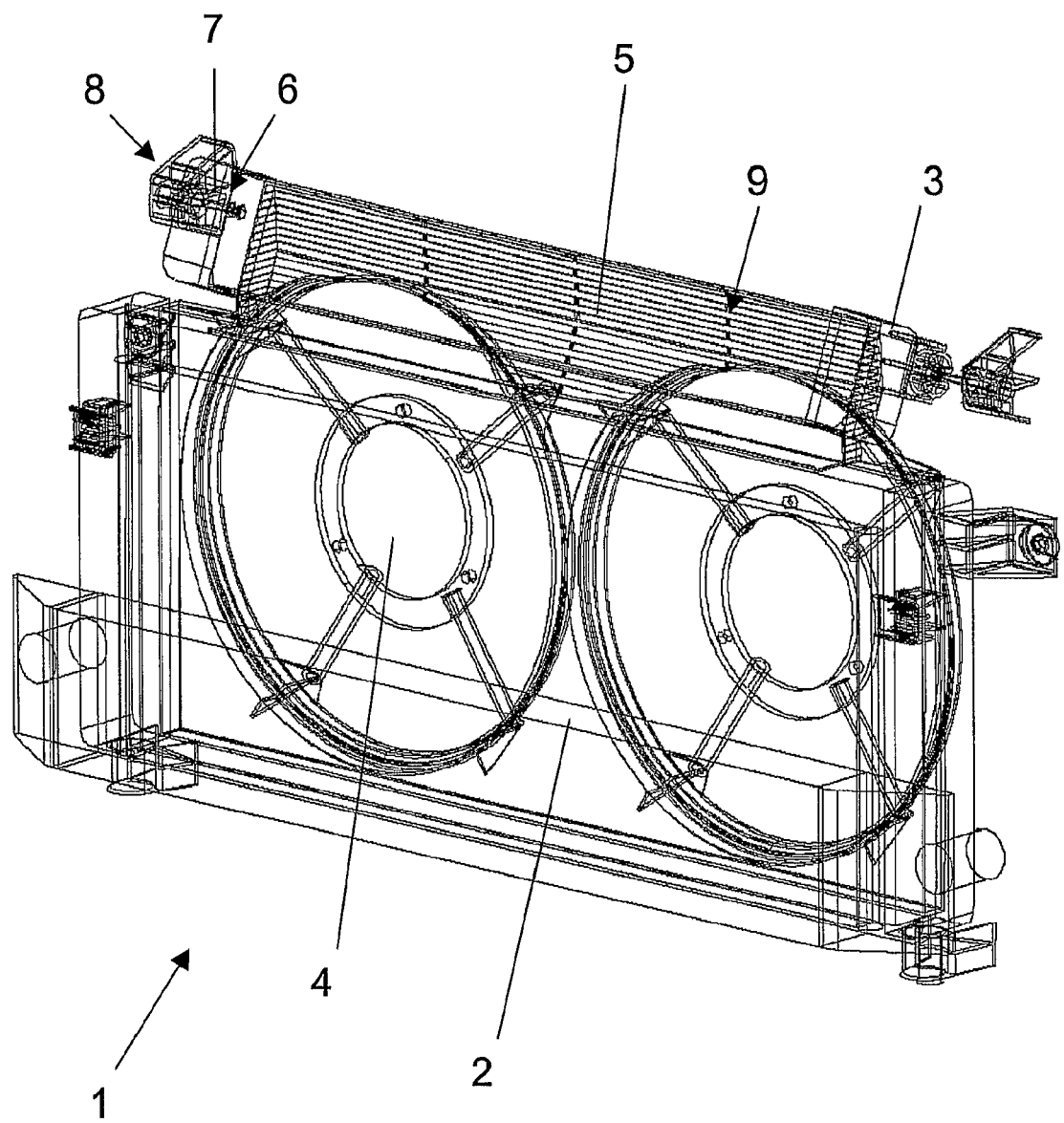

The invention relates to a heat exchanger assembly for the front section of a motor vehicle according to the precharacterizing clause of claim 1.

In order to protect pedestrians, it is prescribed that, in the event of a crash with a pedestrian, a certain force must not be exceeded. Crash-active systems, such as airbags, and passive systems are known for this.

A passive system of this type is known from DE 199 11 832 A1. This describes a supporting structure for an end section of a motor vehicle, the supporting structure serving to protect a pedestrian, with a cross member being provided which is concealed below an outer skin element and is connected in each case in the side sections to those ends of longitudinal members which are directed toward the exterior of the vehicle. In order to provide protection for a pedestrian, firstly the cross member is of multi-beam design and, secondly, at least one deformation element is arranged between the outer skin element and the multi-beam arrangement.

A three-section shield frame is provided here as the multi-beam arrangement, said shield frame being composed of a lower beam supporting a floor skirt, a central beam running in front of a radiator unit and an upper beam running on the upper edge of the radiator unit. In addition, the shield frame comprises a transverse plate which is designed in the manner of an end member and on which a locking unit for a lock hook assigned to the hood is fastened. This lock hook is designed as a part of a deformation bracket which is fastened on the lower side of the hood in the manner of a predetermined deformation body and, together with a first impact absorption element arranged below the bumper covering, forms a front-end upper edge which is soft upon impact. The radiator unit is connected to the shield frame via holding struts. A lowering of the radiator unit is thereby possible and a displacement of the locking unit back into the interior of the vehicle can be undertaken. A second impact absorption element and a third impact absorption element, which at the same time also inherently stabilizes the floor skirt and forms collision protection for the radiator, are provided for the lower leg region of the pedestrian.

However, a heat exchanger assembly of this type still leaves something to be desired.

It is the object of the invention to provide an improved heat exchanger assembly which is to ensure, in particular, the safety of a pedestrian in the event of a crash, and sufficient cooling capacity.

This object is achieved by a heat exchanger assembly with the features of claim 1. Advantageous refinements are the subject matter of the subclaims.

According to the invention, a heat exchanger assembly, in particular radiator assembly for the front section of a motor vehicle, is provided, in which the heat exchanger is of multi-part design in the form of heat exchanger elements, namely at least one main heat exchanger and at least one secondary heat exchanger, and at least two of the heat exchanger elements are arranged such that they can be displaced relative to each other in the event of a crash.

One heat exchanger element, in particular the secondary heat exchanger, is preferably arranged in the designated deformation region, in particular for the event of a pedestrian crash, and, in the event of a crash, can be displaced, in particular rearward, counter to the normal direction of travel of the motor vehicle. The relative displaceability with respect to each other in the event of a crash gives rise to the possibility of optimally configuring a passive safety system for the case of a crash with a pedestrian without impairing the efficiency of the heat exchanger. The heat exchanger here is preferably of two-part design, with, in particular, the main heat exchanger being constructed shallower than conventional heat exchangers, so that it does not protrude into the region relevant for a crash with a pedestrian, and a second secondary heat exchanger which is arranged in the region relevant for a crash with a pedestrian or at least protrudes into the latter, said region being arranged displaceably in such a manner that, in the event of a crash, it is moved out of the hazardous zone with the predetermined maximum deformation or displacement forces being kept to. As a result of the multi-part configuration, the entire heat exchanger capacity can be maintained.

The secondary heat exchanger is preferably arranged with respect to a main heat exchanger at an angle not equal to 180°, preferably an angle of 25°+/−20°. The heat exchanger arranged in the deformation region can thus be oriented in an optimized manner for the event of a crash, with the result that injuries can be kept as slight as possible.

The fitting of the secondary heat exchanger, which is arranged in the deformation region, takes place on a support preferably by means of connecting elements. In this case, the connecting elements are moved out of their bearings counter to the normal direction of travel of the motor vehicle when a limit force is exceeded, so that, when the need arises, the secondary heat exchanger can be displaced counter to the normal direction of travel of the motor vehicle. The connecting elements are preferably formed by pins which are arranged in particular in bearings with slots, the slots being arranged in the displacement direction.

Alternatively, the connecting elements, in particular pins or bolts, can also have predetermined breaking or deformation points, thus ensuring that the secondary heat exchanger can be correspondingly displaced.

The support, formed in particular by a fan frame, has predetermined breaking or deformation points at least in a region into which the secondary heat exchanger can be displaced in the event of a crash, so that a support can be arranged in the deformation region but it does not cause any relevant obstruction of a displacement of the secondary heat exchanger in the event of a crash. The support is preferably of lamellar design, with the lamellae being connected to one another via the predetermined breaking or deformation points.

The fan wheel of the fan preferably has predetermined breaking or deformation points, in particular on the outer ring, inner ring and/or on the transitions from outer and/or inner ring to the fan wheel blades. A fan configured in such a manner additionally ensures sufficient deformation, in particular in the lower region.

Figure 2:
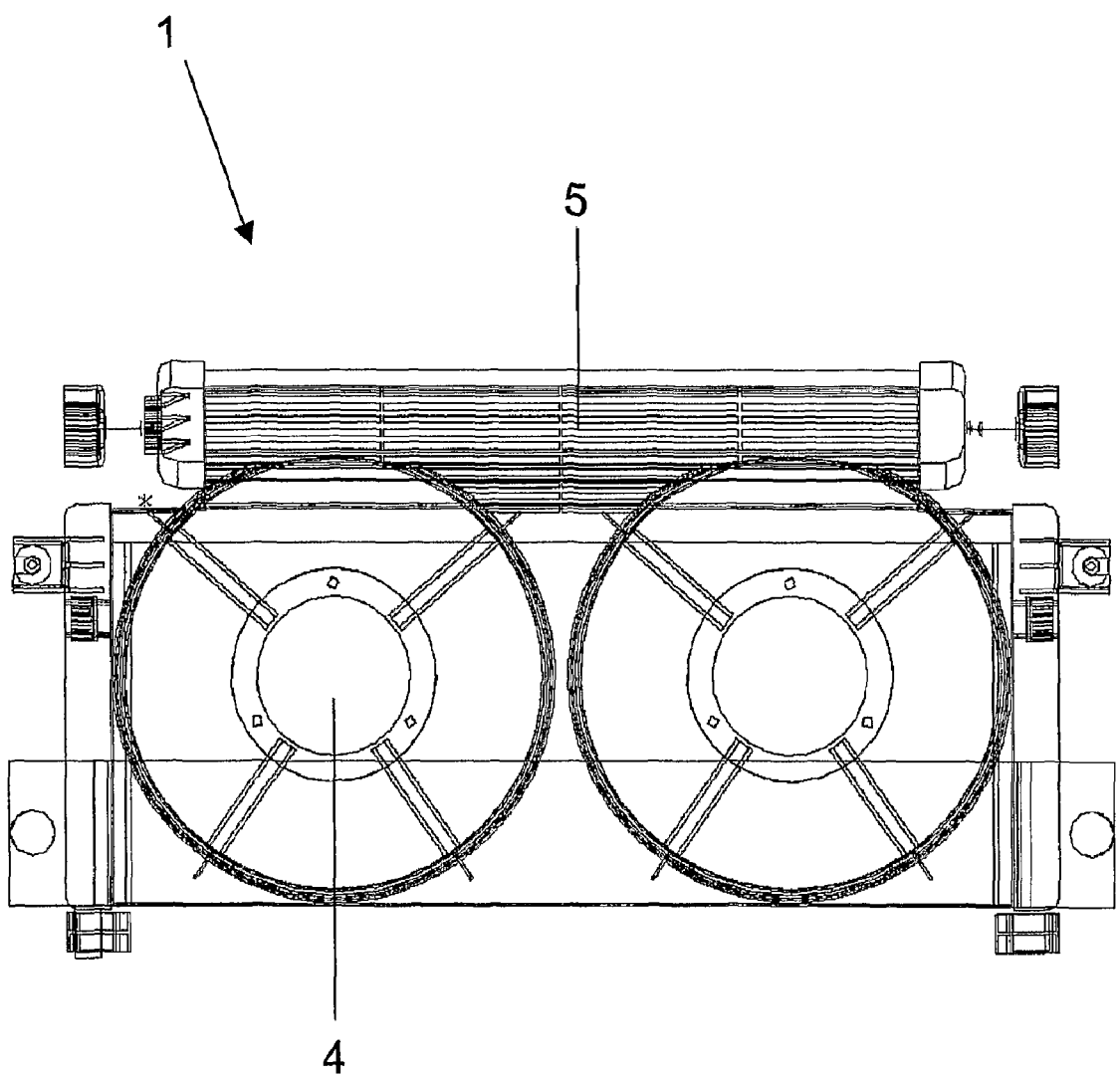
Figure 3:
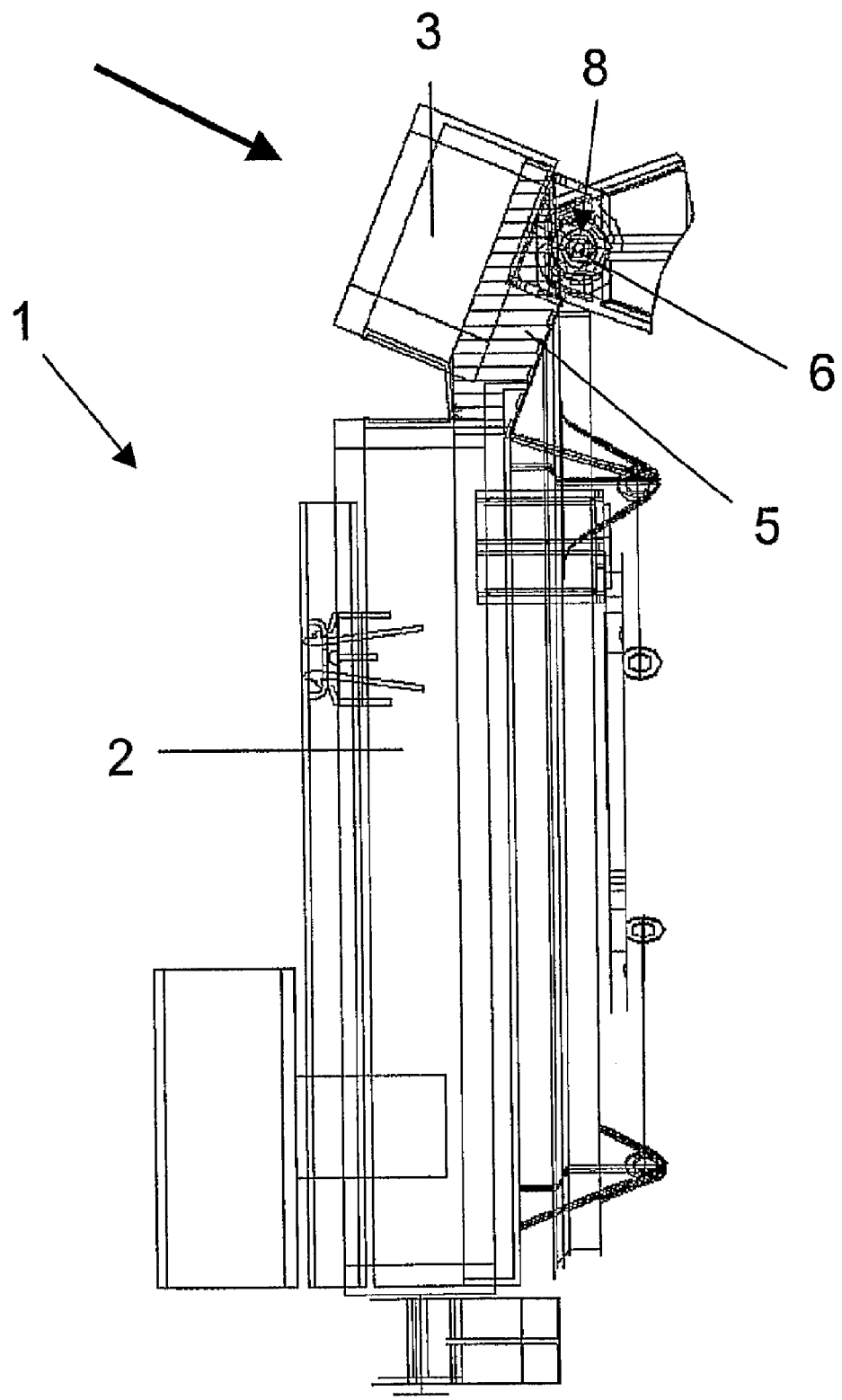
Figure 4:
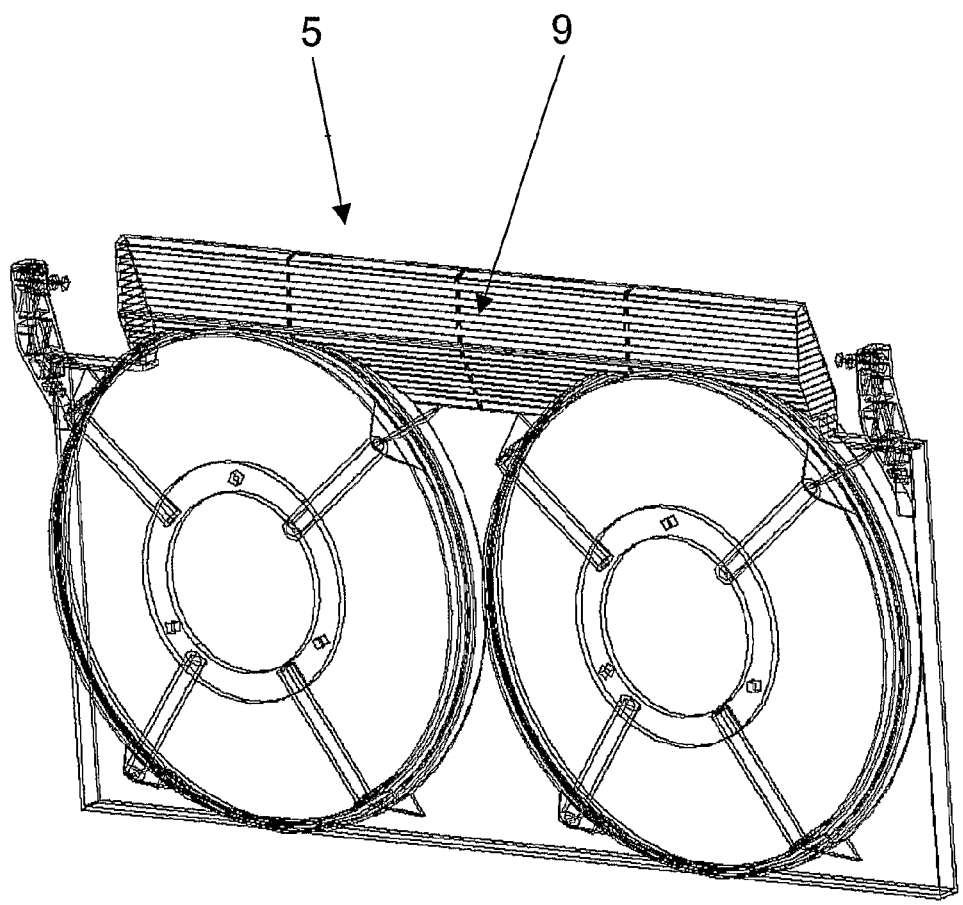
Figure 5:
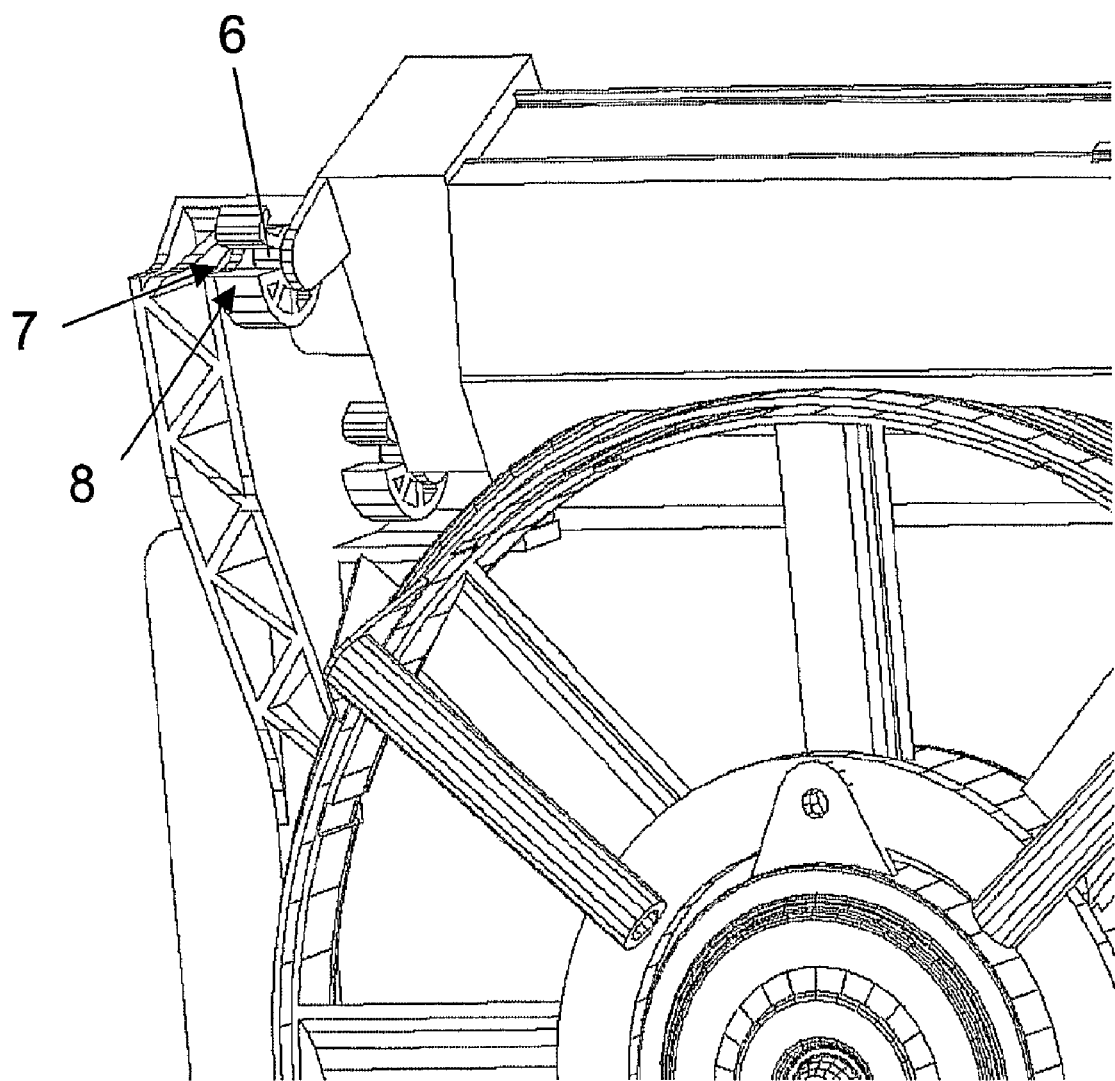
Figure 6:
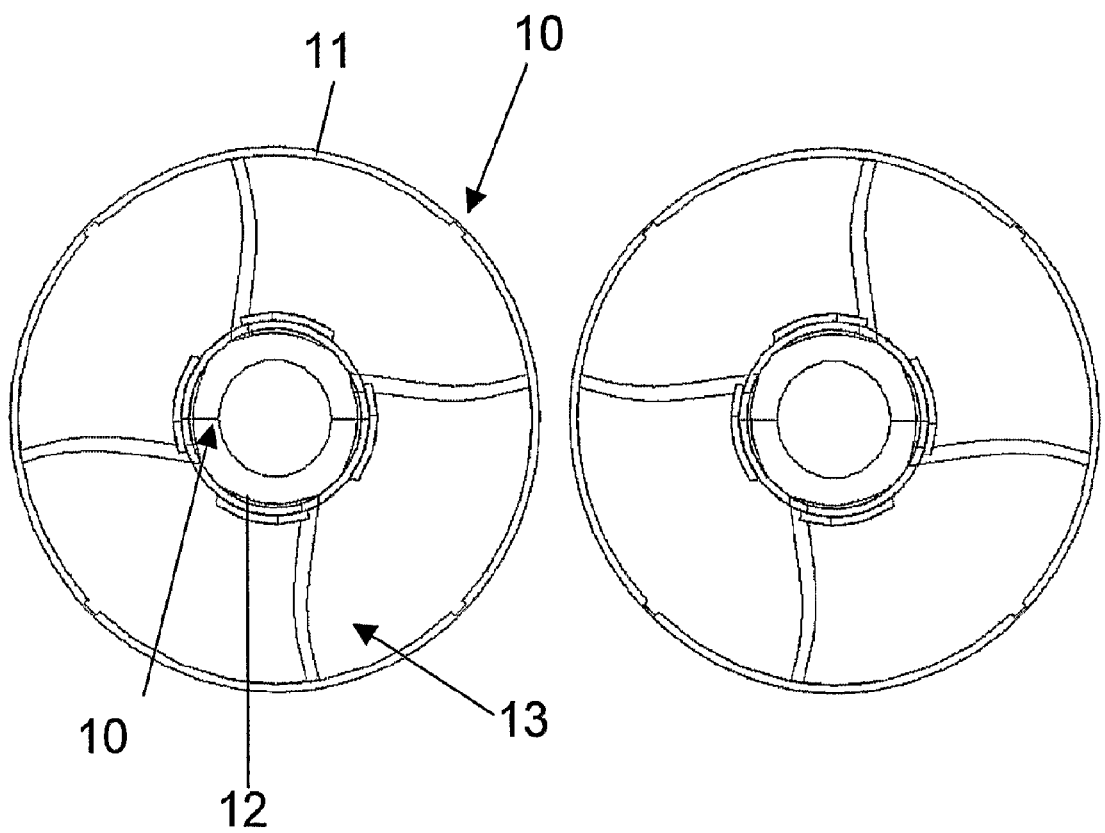
Figure 7:
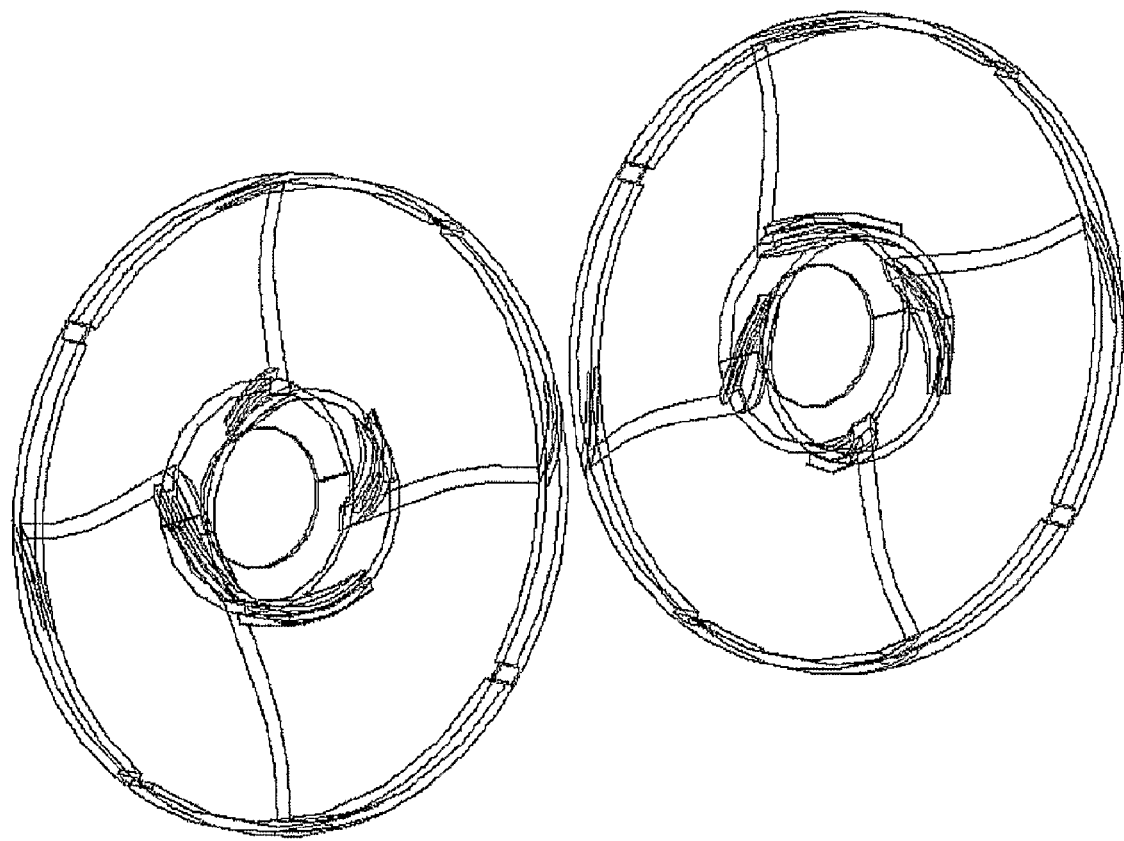

The invention is explained in detail below using an exemplary embodiment and with reference to the drawing, in which:

FIG. 1 shows a perspective illustration of a front section of a motor vehicle from obliquely at the front with a heat exchanger assembly according to the invention having a main and secondary heat exchanger, FIG. 2 shows a front view of the heat exchanger assembly of FIG. 1, FIG. 3 shows a side view of the heat exchanger assembly of FIG. 1, FIG. 4 shows a view corresponding to FIG. 1 without illustrating the main and secondary heat exchangers, FIG. 5 shows a detailed view of the fitting of the secondary heat exchanger, FIG. 6 shows a detailed view of the fan wheels with predetermined breaking points, and FIG. 7 shows a perspective view of the fan wheels of FIG. 6.

A heat exchanger assembly 1 of the front section of a motor vehicle has a main heat exchanger 2, a secondary heat exchanger 3, a fan 4 with two fan wheels arranged next to each other and fan frames 5 as supports. The main and secondary heat exchangers 2 and 3 together form the radiator unit, i.e. the radiator, for cooling the coolant.

To protect pedestrians in the event of a crash, the main heat exchanger 2 is arranged with its upper edge at an appropriately low point and therefore is also designed to be somewhat lower than conventional radiator units. By means of the corresponding configuration of the main heat exchanger 2, a safety zone is formed in the upper region, in particular the upper 120 mm region, which, in the event of a crash, in particular in the event of a crash with a pedestrian, ensures that it can be displaced counter to the normal direction of travel of the motor vehicle (normal direction of travel=X direction), so that, as a result of the buffer or safety zone arising therefrom, injuries occurring in the event of a crash with a pedestrian can be kept as slight as possible.

The secondary heat exchanger 3 is arranged in this safety zone, with its upper region inclined slightly rearward counter to the direction of travel, in the present case by approx. 25°. In this case, the secondary heat exchanger 3 is fixed releasably to the fan frame 5 by means of pins 6. The pins 6 are received in bearings 8 provided laterally with slots 7, so that, when a limit force is exceeded, the pins 6 come out of the bearings 8 because of a force acting counter to the X direction (or a force with a corresponding X component) and the secondary heat exchanger 3 is displaced counter to the normal direction of travel. The inclined arrangement additionally reduces the risk of severe injuries in the event of a crash with a pedestrian as a consequence of edges. In this connection, the impact direction is indicated in FIG. 3 by means of an arrow.

In order to ensure that the secondary heat exchanger 3 can be displaced counter to the normal direction of travel, the fan frame 5, on which the secondary heat exchanger 3 and the fan 4 are fitted, is provided with predetermined breaking and/or deformation points 9 in the safety zone. For this purpose, the fan frame 5, which runs horizontally transversely to the normal direction of travel, has a lamellar structure running in the longitudinal direction of the fan frame 5, with thick, supporting regions being connected via thin regions serving as predetermined breaking and/or deformation points 9. In addition to the predetermined breaking and/or deformation points 9 running in the longitudinal direction, there are also predetermined breaking and/or deformation points 9 running transversely thereto.

In order to further improve the deformability of the front section of the motor vehicle, the two fan wheels of the fan 4 are likewise provided with predetermined breaking points 10, in which case the latter must not impair the operational reliability. These predetermined breaking points 10 are provided in particular on the outer ring 11, on the inner ring 12 and/or on the transitions from inner and/or outer ring to the fan wheel blades 13, so that the flow properties of the fan 4 are not impaired.

In the event of a crash with a pedestrian, the front section of the motor vehicle is deformed, with, if a limit force is exceeded, in addition to a certain deformation of the bumper also a substantial deformation of the engine hood taking place with the secondary heat exchanger 3 arranged in the upper region being displaced longitudinally. In this case, the pins 6, by means of which the secondary heat exchanger 3 is fitted to the fan frame 5, come out of the bearings 8 through the slots 7. Owing to its size, the main heat exchanger 2 is not arranged in the critical region.

LIST OF REFERENCE NUMBERS

1 Heat exchanger assembly
2 Main heat exchanger
3 Secondary heat exchanger
4 Fan
5 Fan frame
6 Pin
7 Slot
8 Bearing
9 Predetermined breaking point
10 Predetermined breaking point
11 Outer ring
12 Inner ring
13 Fan wheel blade

The invention claimed is:

1. A heat exchanger assembly for a front section of a motor vehicle, comprising:
  a heat exchanger,
  wherein the heat exchanger is of multi-part design in a form of heat exchanger elements, wherein the heat exchanger elements comprise at least one main heat exchanger and at least one secondary heat exchanger,
  wherein at least two of the heat exchanger elements are arranged such that the at least two heat exchanger elements can be displaced relative to each other in an event of a crash,
  wherein one heat exchanger element is arranged in a deformation region and, in the event of a crash, can be displaced rearward, at least in some sections, counter to a normal direction of travel of the motor vehicle,
  wherein the heat exchanger element arranged in the deformation region is the at least one secondary heat exchanger,
  wherein a support for the secondary heat exchanger is formed by a fan frame,
  wherein the at least one main heat exchanger is located below the at least one secondary heat exchanger such that a vertical space is provided between the at least one main heat exchanger and the at least one secondary heat exchanger and such that the at least one main heat exchanger and the at least one secondary heat exchanger do not overlap when viewed along a direction extending from the front section of the motor vehicle to a rear of the motor vehicle,
  wherein the secondary heat exchanger is arranged at an angle not equal to 180° with respect to a main heat exchanger.

2. The heat exchanger assembly as claimed in claim 1, wherein one heat exchanger element is at least partially arranged above the other heat exchanger element or elements.

3. The heat exchanger assembly as claimed in claim 1, wherein the secondary heat exchanger is at least partially arranged above the main heat exchanger.

4. The heat exchanger assembly as claimed in claim 1, wherein the secondary heat exchanger is arranged with respect to the main heat exchanger in a manner such that the secondary heat exchanger is inclined rearward at a top at an angle of 25°+/−20° counter to the normal direction of travel of the motor vehicle.

5. The heat exchanger assembly as claimed in claim 1, wherein a secondary heat exchanger is fixed to the support by connecting elements, wherein the connecting elements are configured such that the connecting elements move out of corresponding bearings counter to the normal direction of travel of the motor vehicle when a limit force is exceeded.

6. The heat exchanger assembly as claimed in claim 5, wherein the connecting elements are formed by pins.

7. The heat exchanger assembly as claimed in claim 5, wherein the bearings have slots.

8. The heat exchanger assembly as claimed in claim 5, wherein the connecting elements have predetermined breaking or deformation points.

9. The heat exchanger assembly as claimed in claim 1, wherein the support for the secondary heat exchanger has predetermined breaking or deformation points at least in a region into which the secondary heat exchanger can be displaced in the event of a crash.

10. The heat exchanger assembly as claimed in claim 9, wherein the support is of lamellar design, with the lamellae being connected to one another via the predetermined breaking or deformation points.

11. The heat exchanger assembly as claimed in claim 1, wherein the fan frame is part of the fan, and wherein a fan wheel of the fan has predetermined breaking or deformation points.

12. The heat exchanger assembly as claimed in claim 11, wherein the fan wheel has predetermined breaking or deformation points in a region of an outer ring, an inner ring and/or transitions between the outer ring or the inner ring and fan wheel blades of the fan wheel.

13. A motor vehicle comprising a heat exchanger assembly as claimed in claim 1.

* * * * *

UNITED STATES PATENT AND TRADEMARK OFFICE
CERTIFICATE OF CORRECTION

PATENT NO. : 8,151,920 B2
APPLICATION NO. : 11/575832
DATED : April 10, 2012
INVENTOR(S) : Pradeep Palande et al.

It is certified that error appears in the above-identified patent and that said Letters Patent is hereby corrected as shown below:

Title Page, Item 73

The second listed assignee "HPBO GmbH, Lippstadt (DE)" should be changed to:

--HBPO GmbH, Lippstadt (DE)--

Signed and Sealed this
Eleventh Day of June, 2013

Teresa Stanek Rea
*Acting Director of the United States Patent and Trademark Office*